United States Patent
Cho et al.

[19]

[11] Patent Number: 6,066,417
[45] Date of Patent: May 23, 2000

[54] GLASS-POLYMER COMPOSITE ELECTROLYTE AND A METHOD OF PREPARING THE SAME

[75] Inventors: Jae-phil Cho; Geun-bae Kim, both of Kyungki-do, Rep. of Korea

[73] Assignee: Samsung Display Devices Co., Ltd., Kyungki-do, Rep. of Korea

[21] Appl. No.: 09/083,063

[22] Filed: May 21, 1998

[30] Foreign Application Priority Data

Jun. 10, 1997 [KR] Rep. of Korea ............... 97-23876

[51] Int. Cl.$^7$ ............................................. H01M 6/18
[52] U.S. Cl. .................... 429/303; 429/305; 429/322; 429/207; 252/62.2; 252/500
[58] Field of Search .................... 429/199, 207, 429/303, 305, 319, 322, 323, 188, 189; 252/62.2, 500, 519.4; 204/421

[56] References Cited

U.S. PATENT DOCUMENTS

| | | | |
|---|---|---|---|
| 4,432,891 | 2/1984 | Susman et al. | 252/518 |
| 4,542,108 | 9/1985 | Susman et al. | 501/40 |
| 4,810,599 | 3/1989 | Kondo et al. . | |
| 4,990,413 | 2/1991 | Lee et al. . | |
| 5,217,826 | 6/1993 | Yamamura et al. . | |
| 5,589,296 | 12/1996 | Iwamoto et al. . | |
| 5,622,792 | 4/1997 | Brochu et al. | 429/192 |

FOREIGN PATENT DOCUMENTS

| | | |
|---|---|---|
| 0301774 | 2/1989 | European Pat. Off. . |
| 4-133209 | 5/1992 | Japan . |

OTHER PUBLICATIONS

Quartarone et al. ("Long-term stability of PEO–Li2O:3B2O3–LiClO4 composite solid electrolyte," Electrochimica Acta, vol. 43, pp. 1321–1325), 1998.

Quartarone et al. ("Sol–gel synthesis, thermal characterization and conductivity of new glass–polymer solid electrolytes," J. Therm. Anal. vol. 47, pp. 235–245.). Abstract Provided, 1996.

"Preparation and electrochemical properties of glass–polymer composite electrolytes for lithium batteries", Jaephil Cho and Meilin Liu, *Electrochimica Acta,* vol. 42, No. 10, pp. 1481–1488, 1997 (No Month Available).

*Primary Examiner*—Maria Nuzzolillo
*Assistant Examiner*—Susy Tsang
*Attorney, Agent, or Firm*—Christie, Parker & Hale, LLP

[57] ABSTRACT

A glass-polymer composite electrolyte includes a glass electrolyte having a lithium compound and at least one compound selected from $P_2S_5$, $SiS_2$ or $GeS_2$, and a polymer electrolyte comprising a lithium salt.

20 Claims, 4 Drawing Sheets ents of the present invention;

GLASS-POLYMER COMPOSITE ELECTROLYTE AND A METHOD OF PREPARING THE SAME

CROSS REFERENCE TO RELATED APPLICATION

This application is based on application No. 97-23876 filed in the Korean Industrial Property Office on Jun. 10, 1997, the disclosure of which is incorporated hereinto by reference.

BACKGROUND OF THE INVENTION (a) Field of the Invention

This invention relates to a solid electrolyte and, more particularly, to a glass-polymer composite electrolyte which has a relatively high mechanical flexibility, ion conductivity and stability for lithium batteries.

(b) Description of the Related Art

Lithium is the lightest metal and has a high electronegativity. Therefore, lithium can be used to produce a cell having a large current capacity per unit of mass and high voltage. However, a lithium battery has a stability problem because of reactivity between the lithium metal and a liquid electrolyte. To overcome this problem, a lithium ion battery using a material allowing intercalation and deintercalation of lithium ions for an anode has been developed. And a lithium polymer battery, which uses a solid polymer electrolyte instead of the liquid electrolyte, has been developed. But the solid polymer electrolyte, such as poly(ethylene oxide) and poly(propylene oxide), have a relatively low ion conductivity. The solid electrolyte is easily crystallized at 70~80° C., its ion conductivity decreases steeply.

A glass electrolyte is one of solid electrolytes for the lithium battery. It is difficult to handle because of its glass phase. It is liable to crack in charging/discharging. It can be applied to only a non-rechargeable lithium battery and not be applied to a rechargeable lithium battery.

In recent years, to overcome these problems of the polymer electrolyte and the glass electrolyte, a glass-polymer composite electrolyte consisting of $B_2S_3$—$Li_2S$—LiI and poly(ethylene oxide)—$LiN(CF_3SO_2)_2$ has been proposed (Jaephil Cho and Meilin Liu, Georgia Institute of Technology, *Electrochimica Acta*, Vol. 42, No.10, pp 1481–1488, 1997). But the glass-polymer composite electrolyte has a drawback in that the glass electrolyte and polymer electrolyte react each other. Furthermore, $H_2O$ molecules in the polymer electrolyte react with the glass electrolyte. A method of preparing $B_2S_3$ is very complex. Pure $B_2S_3$ is difficult to prepare. $B_2S_3$ has a very low stability under oxygen gas atmosphere.

SUMMARY OF THE INVENTION

It is an object of the present invention to provide a glass-polymer composite electrolyte, which can be applied to rechargeable lithium batteries as well as non-rechargeable lithium batteries, is easy to handle, has a relatively high mechanical flexibility and ion conductivity, and shows no side-reaction of a glass electrolyte and a polymer electrolyte.

In order to achieve this object and others, the invention provides a glass-polymer composite electrolyte having a glass electrolyte which includes at least one lithium compound and at least one compound selected from $B_2O_3$, $P_2S_5$, $SiS_2$ or $GeS_2$, and a polymer electrolyte.

Also, the present invention provides a method of preparing a glass-polymer composite electrolyte, which comprises the steps of heating a mixture of at least one lithium compound and at least one compound selected from $B_2O_3$, $P_2S_5$, $SiS_2$ or $GeS_2$ at 700~900° C., forming a glass electrolyte of glassy phase by cooling the mixture, mixing the glass electrolyte and a polymer electrolyte to produce a composite electrolyte, and shaping by compressing the composite electrolyte at 60~110 ° C.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
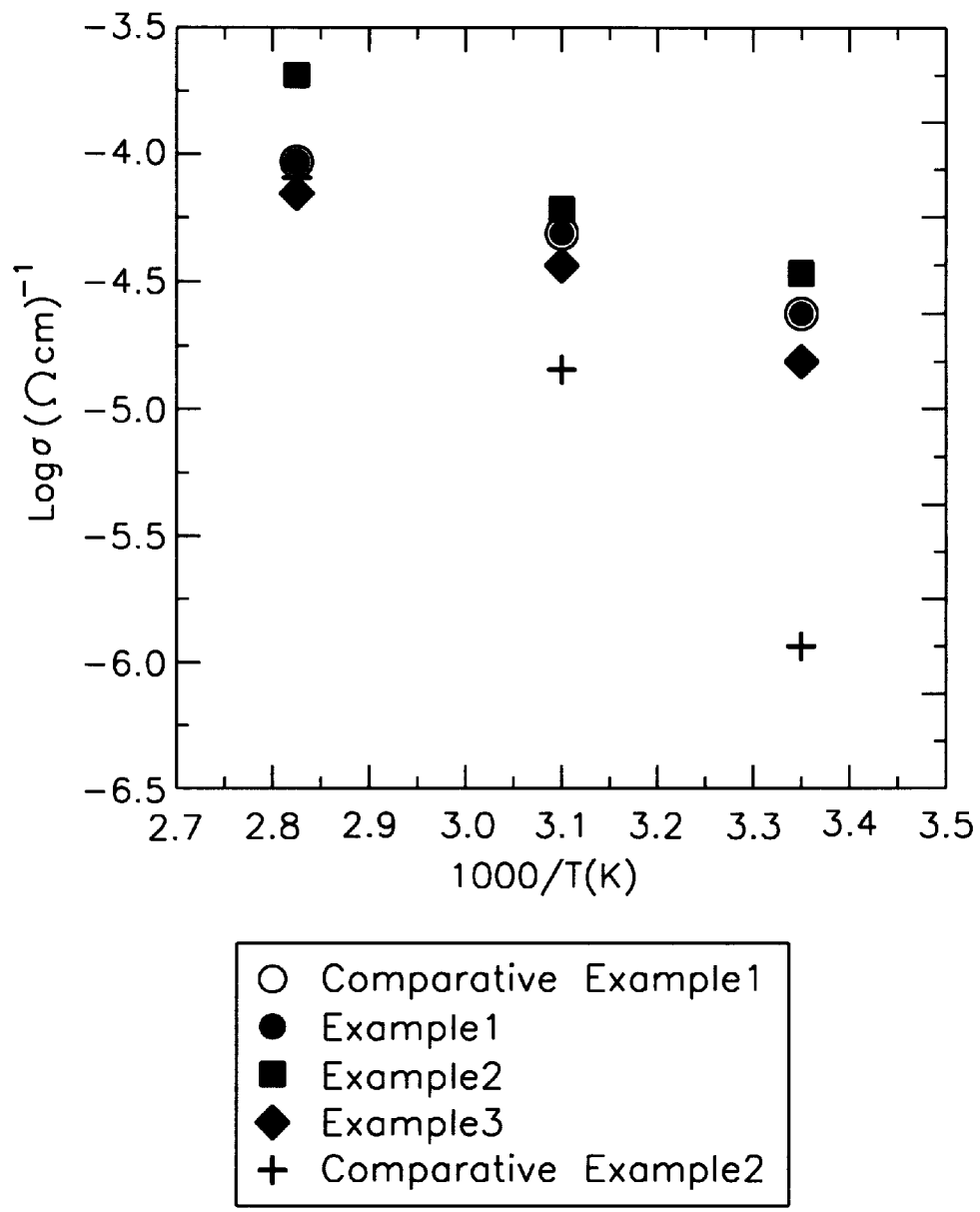
FIG. 1 is a graph showing the ion conductivities of glass-polymer composite electrolytes according to embodiments of the present invention.

The first aspect of the present invention is a glass-polymer composite electrolyte having a glass electrolyte which includes at least one lithium compound and at least one compound selected from $B_2O_3$, $P_2S_5$, $SiS_2$ and $GeS_2$, and a polymer electrolyte.

$GeS_2$ is the most preferred compound as one element of the glass-polymer composite electrolyte. Preferably, the lithium compound is at least one element selected from $Li_2S$, LiI, $Li_2O$, $Li_2SO_4$, LiBr and LiCl. Preferably, the glass electrolyte is $GeS_2$—$Li_2S$—LiI. Preferably, the molar ratio of the $GeS_2$:$Li_2S$:LiI in the $GeS_2$—$Li_2S$—LiI is 0.3~0.45:0.1~0.3:0~0.25. Preferably, the polymer electrolyte includes a lithium salt and at least one polymer selected from poly(ethylene oxide), poly(propylene oxide), poly (vinylidene fluoride) and poly(acrylonitrile). Preferably, the lithium salt is at least one compound selected from $LiClO_4$, $LiCF_3SO_3$, $LiAsF_6$, $LiPF_6$, $LiN(CF_3SO_2)_2$, LiBr or lithium acetate.

Preferably, the volume ratio of the glass electrolyte:polymer electrolyte in the glass-polymer composite electrolyte is 75:25~93:7. When the polymer electrolyte is more than 25 vol %, the ion conductivity of the glass-polymer composite electrolyte becomes lower.

The second aspect of the present invention is a method of preparing a glass-polymer composite electrolyte, which comprises the steps of heating a mixture of at least one lithium compound and at least one compound selected from $B_2O_3$, $P_2S_5$, $SiS_2$ or $GeS_2$ at 700~900 ° C., forming a glass electrolyte of glassy phase by cooling the mixture, mixing the glass electrolyte and a polymer electrolyte to produce a composite electrolyte, and shaping by compressing the composite electrolyte at 60~110° C.

Preferably, the heating step is carried out under vacuum, nitrogen gas or noble gas such as argon. Preferably, the glass electrolyte used in the mixing step is powder type. It is preferable that the shaping step is carried out at 70~90° C.

for 1~3 hr. The time of the shaping step can be changed depend on the quantity of the composite electrolyte.

Also, the present invention provides a battery using the glass-polymer composite electrolyte. Preferably, the battery is a lithium ion battery. The battery can use a graphite or an amorphous carbon for an anode material and $LiMn_2O_4$, $LiCoO_2$ or other lithium metal oxide compound for a cathode material. According to the conventional method of preparing a lithium ion battery, those skilled in the art can make a lithium ion battery using the glass-polymer composite electrolyte of the present invention.

EXAMPLE 1

Appropriate amounts of germanium (99.99%, ESPI Co. Ltd.) and sulfur (99.99%, Alfa Co. Ltd.) were mixed and the mixture was then transferred to a silica tube. The tube was vacuumed and baked at 900° C. for 12 hrs. Then, the tube was cooled in air and glassy $GeS_2$ was obtained. The $GeS_2$ 5.7 g, LiI (99.99%, Alfa Co. Ltd.) 1.3 g and $Li_2S$ (99.9%, Cerac Co. Ltd.) 3 g were mixed. The mixture was transferred to a quartz tube. The quartz tube was baked at 800° C. for 15 mins under vacuum and cooled in a liquid nitrogen. A glass electrolyte of $0.45GeS_2$—$0.3Li_2S$—$0.25LiI$ was obtained.

A polymer electrolyte was prepared by dry ball milling poly(ethylene oxide) [PEO] and $LiN(CF_3SO_2)_2$ in the ratio of 8:1.

The prepared glass electrolyte and polymer electrolyte were mixed in the volume ratio of 93:7. The mixture was put in a die having a diameter of 13 mm and shaped by compressing gradually in the pressure of 1~3 ton/cm$^2$ at 80° C. for 2 hrs. A glass-polymer composite electrolyte consisting of 93 vol % [$0.45GeS_2$—$0.3Li_2S$—$0.25LiI$] and 7 vol % [PEO—$LiN(CF_3SO_2)_2$] was obtained.

EXAMPLE 2

A glass electrolyte was prepared according to Example 1.

A polymer electrolyte was prepared according to Example 1.

The prepared glass electrolyte and polymer electrolyte were mixed in the volume ratio of 87:13. The mixture was put in a die having a diameter of 13 mm and shaped by compressing gradually in the pressure of 1~3 ton/cm$^2$ at 80° C. for 2 hrs. A glass-polymer composite electrolyte consisting of 87 vol % [$0.45GeS_2$—$0.3Li_2S$—$0.25LiI$] and 13 vol % [PEO—$LiN(CF_3SO_2)_2$] was obtained.

EXAMPLE 3

A glass electrolyte was prepared according to Example 1.

A polymer electrolyte was prepared according to Example 1.

The prepared glass electrolyte and polymer electrolyte were mixed in the volume ratio of 75:25. The mixture was put in a die having a diameter of 13 mm and shaped by compressing gradually in the pressure of 1~3 ton/cm$^2$ at 80° C. for 2 hrs. A glass-polymer composite electrolyte consisting of 75 vol % [$0.45GeS_2$—$0.3Li_2S$—$0.25LiI$] and 25 vol % [PEO—$LiN(CF_3SO_2)_2$] was obtained.

EXAMPLE 4

Boron hydroxide was melted by baking at 1000° C. for 4~5 hrs. $B_2O_3$ was prepared by quenching it. The $B_2O_3$ 4.3 g, LiI (99.99%, Alfa Co. Ltd.) 1.3 g and $Li_2O$ (99.9%, Cerac Co. Ltd.) 4.5 g were mixed. The mixture was transferred to a quartz tube. The quartz tube was baked at 800° C. for 15 mins under vacuum and cooled in a liquid nitrogen. A glass electrolyte of $0.45B_2O_3$—$0.3Li_2O$—$0.25LiI$ was obtained.

A polymer electrolyte was prepared by dry ball milling PEO and $LiN(CF_3SO_2)_2$ in the ratio of 8:1.

The prepared glass electrolyte and polymer electrolyte were mixed in volume the ratio of 87:13. The mixture was put in a die having a diameter of 13 mm and shaped by compressing gradually in the pressure of 1~3 ton/cm$^2$ at 80° C. for 2 hrs. A glass-polymer composite electrolyte consisting of 87 vol % [$0.45B_2O_3$—$0.3Li_2O$—$0.25LiI$] and 13 vol % [PEO—$LiN(CF_3SO_2)_2$] was obtained.

EXAMPLE 5

$P_2S_5$ 6.8 g, LiI (99.99%, Alfa Co. Ltd.) 2.2 g and $Li_2S$ (99.9%, Cerac Co. Ltd.) 1 g were mixed. The mixture was transferred to a quartz tube. The quartz tube was baked at 800° C. for 15 mins under vacuum and cooled in a liquid nitrogen. A glass electrolyte of $0.45P_2S_5$—$0.3Li_2S$—$0.25LiI$ was obtained.

A polymer electrolyte was prepared by dry ball milling PEO and $LiN(CF_3SO_2)_2$ in the ratio of 8:1.

The prepared glass electrolyte and polymer electrolyte were mixed in the volume ratio of 87:13. The mixture was put in a die having a diameter of 13 mm and shaped by compressing gradually in the pressure of 1~3 ton/cm$^2$ at 80° C. for 2 hrs. A glass-polymer composite electrolyte consisting of 87 vol % [$0.45P_2S_5$—$0.3Li_2S$—$0.25LiI$] and 13 vol % [PEO—$LiN(CF_3SO_2)_2$] was obtained.

EXAMPLE 6

Silicon and sulfur were mixed in the molar ratio of 1:2. The mixture was reacted at 900° C. for 1 week in a quartz tube under vacuum. $SiS_2$ was obtained by breaking the quartz tube.

$SiS_2$ 4.7 g, LiI (99.99%, Alfa Co. Ltd.) 1.6 g and $Li_2S$ (99.9%, Cerac Co. Ltd.) 3.7 g were mixed. The mixture was transferred to a quartz tube. The quartz tube was baked at 800° C. for 15 mins under vacuum and cooled in a liquid nitrogen. A glass electrolyte of $0.45SiS_2$—$0.3Li_2S$—$0.25LiI$ was obtained.

A polymer electrolyte was prepared by dry ball milling PEO and $LiN(CF_3SO_2)_2$ in the ratio of 8:1.

The prepared glass electrolyte and polymer electrolyte were mixed in the volume ratio of 87:13. The mixture was put in a die having a diameter of 13 mm and shaped by compressing gradually in the pressure of 1~3 ton/cm$^2$ at 80° C. for 2 hrs. A glass-polymer composite electrolyte consisting of 87 vol % [$0.45SiS_2$—$0.3Li_2S$—$0.25LiI$] and 13vol % [PEO—$LiN(CF_3SO_2)_2$] was obtained.

Comparative Example 1

$GeS_2$ 5.7 g, LiI (99.99%, Alfa Co. Ltd.) 1.3 g and $Li_2S$ (99.9%, Cerac Co. Ltd.) 3 g were mixed. The mixture was transferred to a quartz tube. The quartz tube was baked at 800° C. for 15 mins under vacuum and cooled in a liquid nitrogen. A glass electrolyte of $0.45GeS_2$—$0.3Li_2S$—$0.25LiI$ was obtained.

Comparative Example 2

A polymer electrolyte was prepared by dry ball milling PEO and $LiN(CF_3SO_2)_2$ in the ratio of 8:1.

Comparative Example 3

Boron 0.76 g and sulfur (99.99%, Alfa Co. Ltd.) 3.24 g were mixed and the mixture was then transferred to a carbon-coated silica tube. The tube was vacuumed and sealed. The tube was baked at 900° C. for 12 hrs. The tube was cooled in air. Glassy $B_2S_3$ was obtained. $B_2S_3$ 5.3 g, LiI (99.99%, Alfa Co. Ltd.) 3.3 g and $Li_2S$ (99.9%, Cerac Co. Ltd.) 1.4 g were mixed. The mixture was transferred to a quartz tube. The quartz tube was baked at 800° C. for 15 mins under vacuum and cooled in a liquid nitrogen. A glass electrolyte of $0.45B_2S_3$—$0.3Li_2S$—$0.25LiI$ was obtained.

A polymer electrolyte was prepared by dry ball milling PEO and $LiN(CF_3SO_2)_2$ in the ratio of 8:1.

The prepared glass electrolyte and polymer electrolyte were mixed in the volume ratio of 87:13. The mixture was put in a die having a diameter of 13 mm and shaped by compressing gradually in the pressure of 1~3 ton/$cm^2$ at 80° C. for 2 hrs. A glass-polymer composite electrolyte consisting of 87 vol % [$0.45B_2S_3$—$0.3Li_2S$—$0.25LiI$] and 13 vol % [PEO—$LiN(CF_3SO_2)_2$] was obtained.

※Preparation of a lithium ion battery※

$LiMn_2O_4$ was prepared by baking $LiNO_3$ and $MnO_2$ at 800° C. for 30 hrs. A cathode material was made of $LiMn_2O_4$, the glass-polymer composite electrolyte of Example 2 and acetylene carbon black in the weight ratio of 50:40:10.

An anode material was made of a petroleum coke and the glass-polymer composite electrolyte of Example 2 in the weight ratio of 60:40.

The weight ratio of the $LiMn_2O_4$ and the petroleum coke was 1:2.

The powdered cathode material and powdered anode material were dispersed beneath and on the glass-polymer composite electrolyte of Example 2 and shaped by compressing at 90° C.

Figure 4:
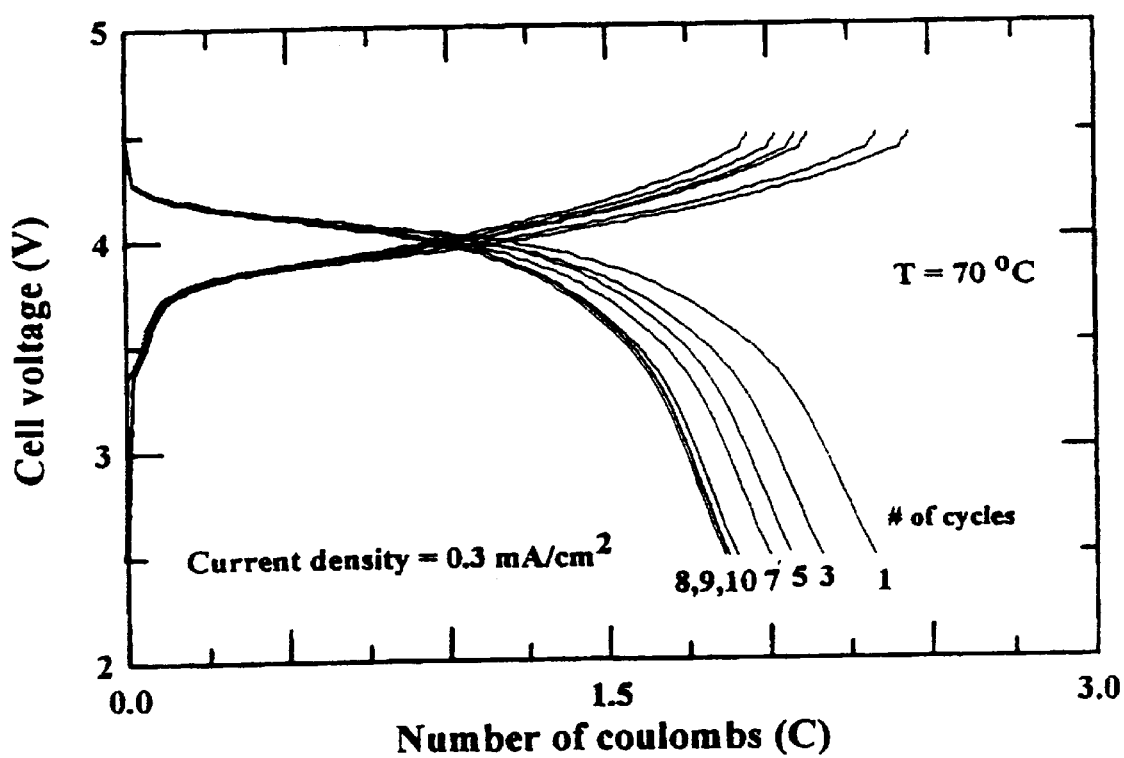
FIG. 4. is a graph showing charge/discharge curves of a cell with a glass-polymer composite electrolyte according to an embodiment of the present invention.

A lithium ion coin cell was prepared by sandwiching the glass-polymer composite electrolyte between a composite $LiMn_2O_4$ electrode and a composite carbon electrode. The thickness of the coin cell was 150~200 $\mu$m and its open cell voltage before being charging at 70° C. was 0.1V. The cell was cycled between 2.5V and 4.5V (FIG. 4). The initial capacity was 2.36 C and a capacity after 10 cycles of charging/discharging was 1.87 C.

The electrolyte ion conductivities of Example 1, Example 2, Example 3, Comparative Example 1 and Comparative Example 2 were determined by the AC and DC measurements method (FIG. 1). The ion conductivity of the Example 2 was $4.5 \times 10^{-5}$ (cm. $\Omega$)$^{-1}$ at room temperature and $2 \times 10^{-4}$ (cm. $\Omega$)$^{-1}$ at 80° C.

Figure 2:
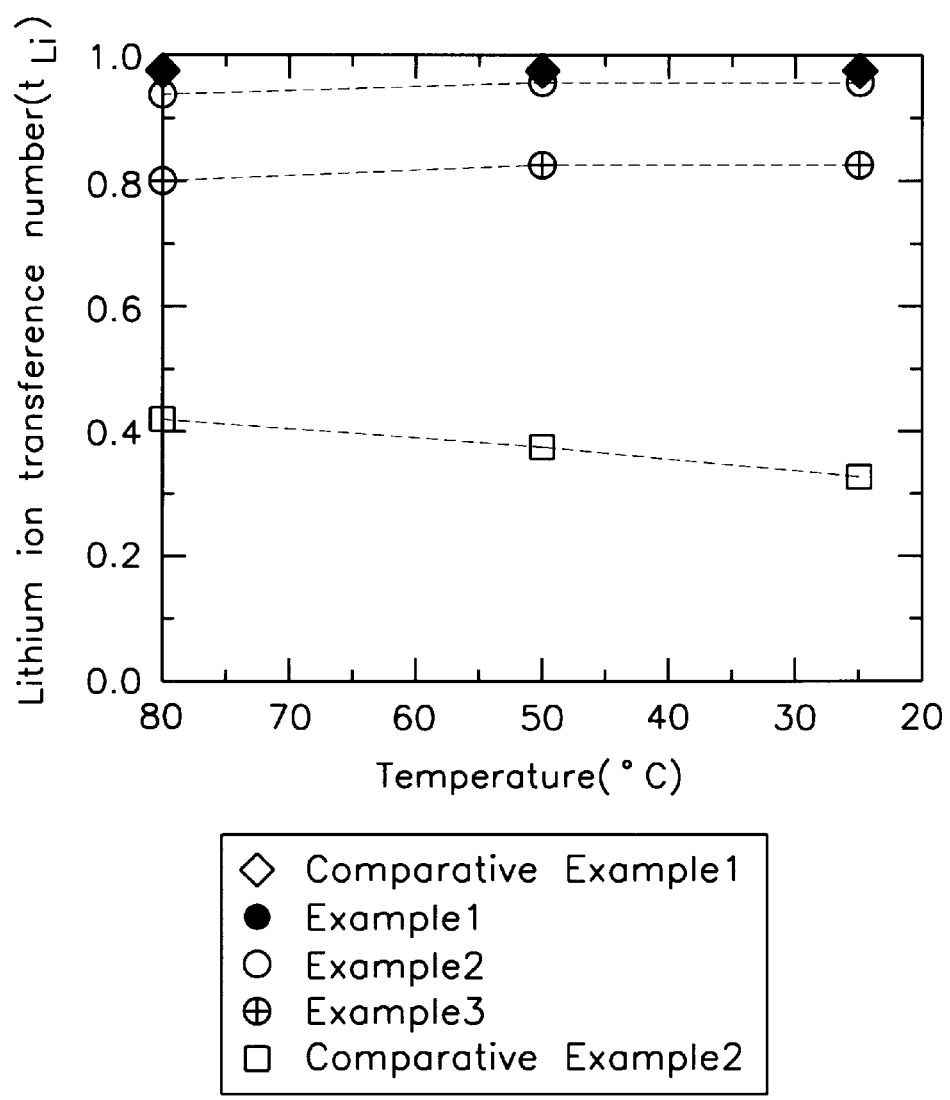
FIG. 2. is a graph showing a lithium ion transference number of a glass-polymer composite electrolyte according to embodiments of the present invention.

FIG. 2 shows the lithium ion transference numbers ($t_{LI}$) of the electrolytes of Example 1, Example 2, Example 3, Comparative Example 1 and Comparative Example 2. As shown FIG. 2, the $t_{LI}$ of Example 1 and Example 2 at 80° C. were about 1 but the $t_{LI}$ of Comparative Example 2 was 0.4. Therefore, these glass-polymer composite electrolytes of Example 1 and Example 2 can use about 100% of the total lithium ion in charging/discharging, but the electrolyte of Comparative Example 2 can use about 40% of total lithium ion in charging/discharging.

Since the polymer electrolyte is easily crystallized at 70~80° C., the ion conductivity and the lithium ion transference number becomes lower at 70~80° C. However, the glass-polymer composite electrolyte of the present invention have a relatively high ion conductivity at 70~80° C. Therefore, it can be used for a long time at 70~80° C.

Figure 3:
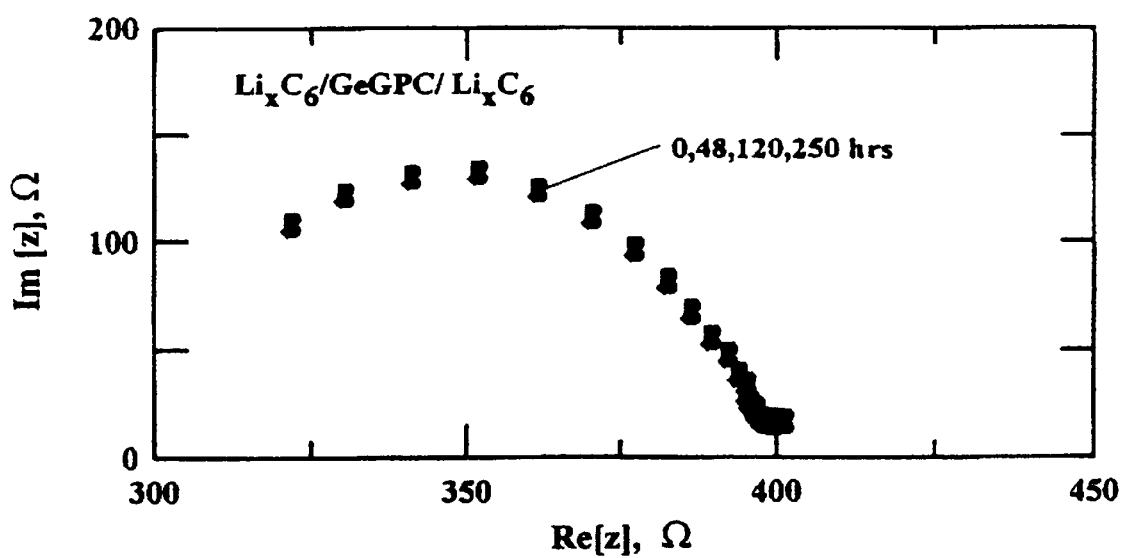
FIG. 3. is a graph showing an interfacial stability between a glass-polymer composite electrolyte according to embodiments of the present invention and $Li_xC_6$ at 70° C.

The cell of $Li_xC_6$/glass-polymer composite electrolyte consisting of 93 vol % [$0.45GeS_2$—$0.3Li_2S$—$0.25LiI$] and 7 vol % [PEO—$LiN(CF_3SO_2)_2$]/$Li_xC_6$ were prepared. The stability of the glass-polymer composite electrolyte against $Li_xC_6$ was determined at 70° C. (FIG. 3). The change of the interfacial resistance between $Li_xC_6$ and the glass-polymer composite electrolyte according to time was negligible. Therefore, the chemical stability of the glass-polymer composite electrolyte and $Li_xC_6$ was good.

Compared to the glass electrolyte, the glass-polymer composite electrolyte have a relatively high packing density since the pores between the glass particles are filled with the polymer.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A glass-polymer composite electrolyte comprising:
    a glass electrolyte comprising at least one lithium compound and at least one compound selected from the group consisting of $P_2S_5$, $SiS_2$ and $GeS_2$; and
    a polymer electrolyte comprising a lithium salt.

2. The glass-polymer composite electrolyte of claim 1 wherein the compound is $GeS_2$.

3. The glass-polymer composite electrolyte of claim 1 wherein the at least one lithium compound is at least one compound selected from the group consisting of $Li_2S$, LiI, $Li_2O$, $Li_2SO_4$, LiBr and LiCl.

4. The glass-polymer composite electrolyte of claim 1 wherein the glass electrolyte is $GeS_2$—$Li_2S$—LiI.

5. The glass-polymer composite electrolyte of claim 1 wherein the glass electrolyte comprises $GeS_2$:$Li_2S$:LiI in a molar ratio of 0.3–0.45:0.1–0.3:0–0.25.

6. The glass-polymer composite electrolyte of claim 1 wherein the polymer electrolyte comprises at least one polymer selected from the group consisting of poly(ethylene oxide), poly(propylene oxide), poly(vinylidene fluoride), and poly(acrylonitrile).

7. The glass-polymer composite electrolyte of claim 6 wherein the lithium salt comprises at least one compound selected from the group consisting of $LiClO_4$, $LiCF_3SO_3$, $LiAsF_6$, $LiPF_6$, $LiN(CF_3SO_2)_2$, LiBr and lithium acetate.

8. The glass-polymer composite electrolyte of claim 1 wherein the volume ratio of the glass electrolyte:polymer electrolyte is 75:25 to 93:7.

9. The glass-polymer electrolyte of claim 1, wherein the compound is $P_2S_5$.

10. The glass-polymer electrolyte of claim 1, wherein the compound is $SiS_2$.

11. A battery comprising a glass-polymer composite electrolyte of claim 1.

12. The battery of claim 11 wherein the compound is $GeS_2$.

13. The battery of claim 11 wherein the glass electrolyte is $GeS_2$LiS—LiI.

14. The battery of claim 11 wherein the glass electrolyte comprises $GeS_2$:$Li_2S$:LiI in a molar ratio of 0.3–0.45:0.1–0.3:0–0.25.

15. A method of preparing a glass-polymer composite electrolyte comprising:
    heating a mixture of at least one lithium compound and at least one compound selected from the group consisting of $P_2S_5$, $SiS_2$ and $GeS_2$ at 700 to 900° C.;
    forming a glass electrolyte by cooling the mixture;
    mixing the glass electrolyte with a polymer electrolyte comprising a lithium salt to produce a composite electrolyte; and shaping by compressing the composite electrolyte at 60 to 100° C.

16. The method of claim 15 wherein the compound is $GeS_2$.

17. The method of claim 15 wherein the glass electrolyte is $GeS_2$—$Li_2$—LiI.

18. The method of preparing a glass-polymer composite electrolyte of claim 15 wherein the glass electrolyte comprises $GeS_2:Li_2S:LiI$ in a molar ratio of 0.3–0.45:0.1–0.3:0–0.25.

19. The method of claim 15, wherein the compound is $P_2S_5$.

20. The method of claim 15, wherein the compound is $SiS_2$.

* * * * *